No. 817,243. PATENTED APR. 10, 1906.
F. HEATH.
POCKET CAMERA.
APPLICATION FILED NOV. 7, 1904. RENEWED OCT. 4, 1905.
4 SHEETS—SHEET 1.
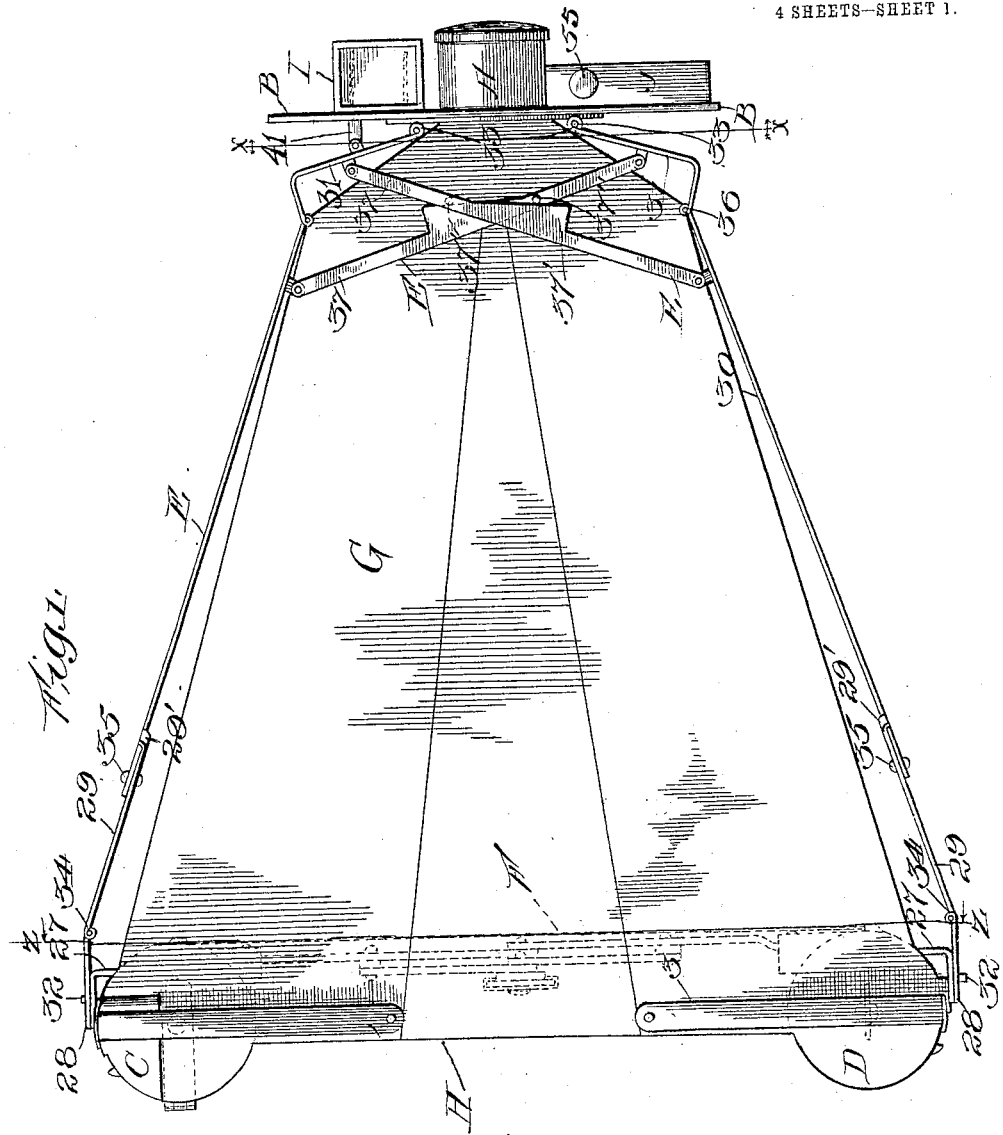
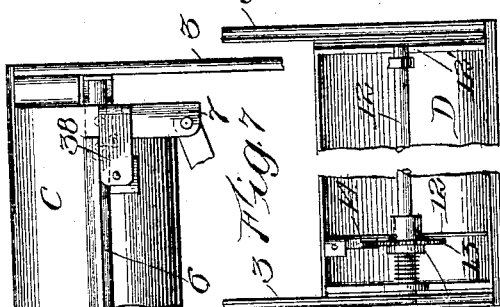
Witnesses:
O. W. Hemick
L. S. Morry
Inventor:
Frank Heath.
By
Charles Gilbert Hawley
Atty.

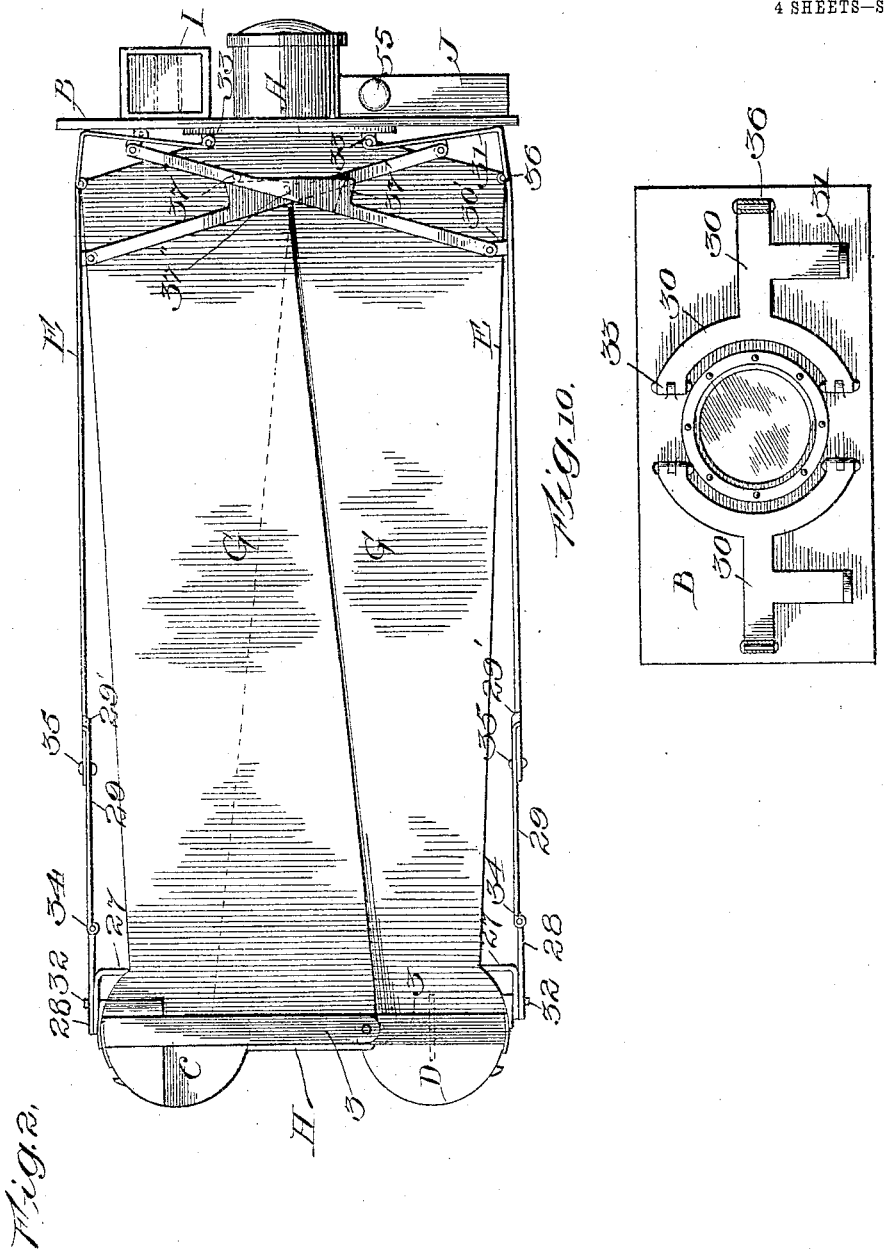

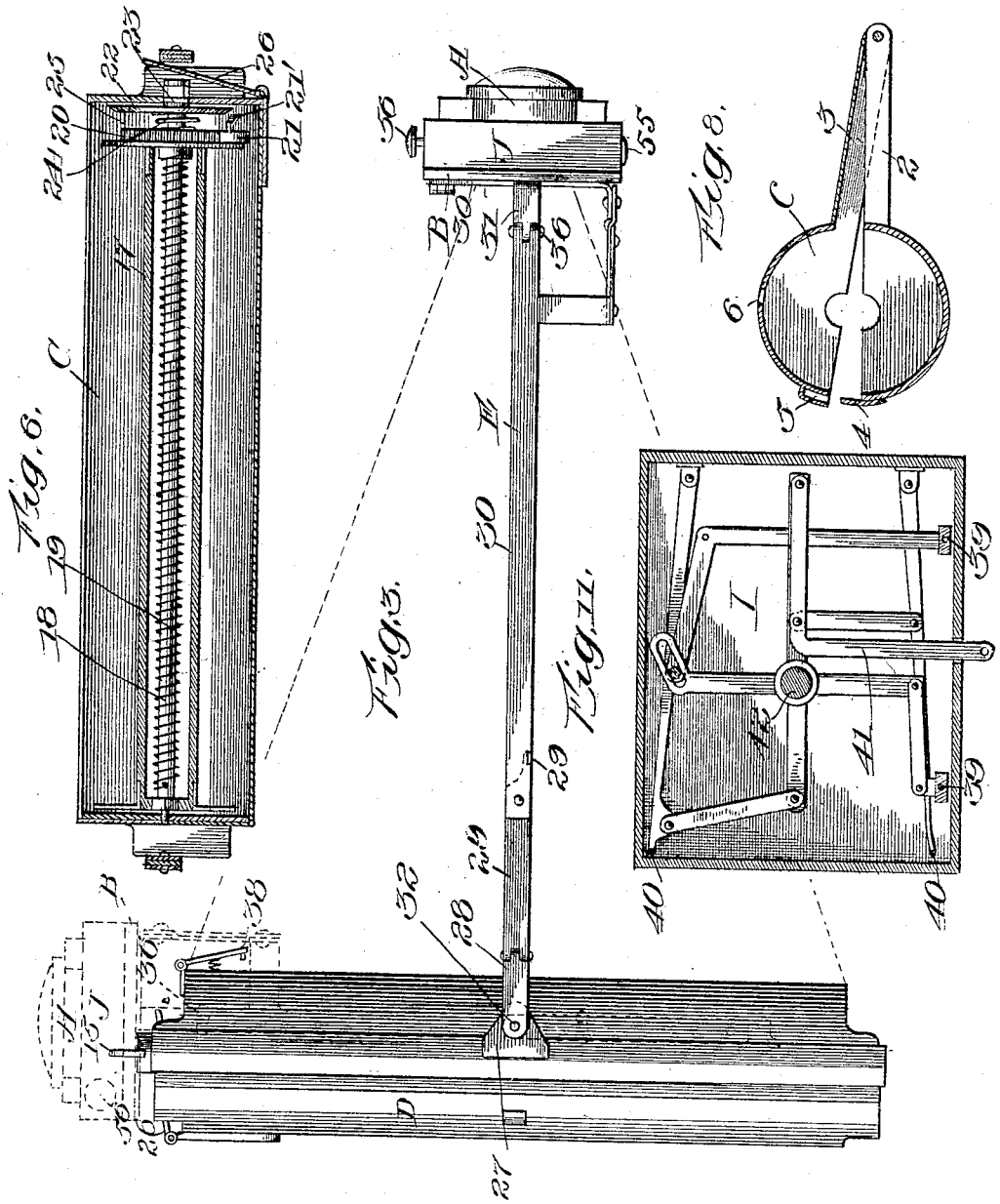

No. 817,243. PATENTED APR. 10, 1906.
F. HEATH.
POCKET CAMERA.
APPLICATION FILED NOV. 7, 1904. RENEWED OCT. 4, 1905.
4 SHEETS—SHEET 4.
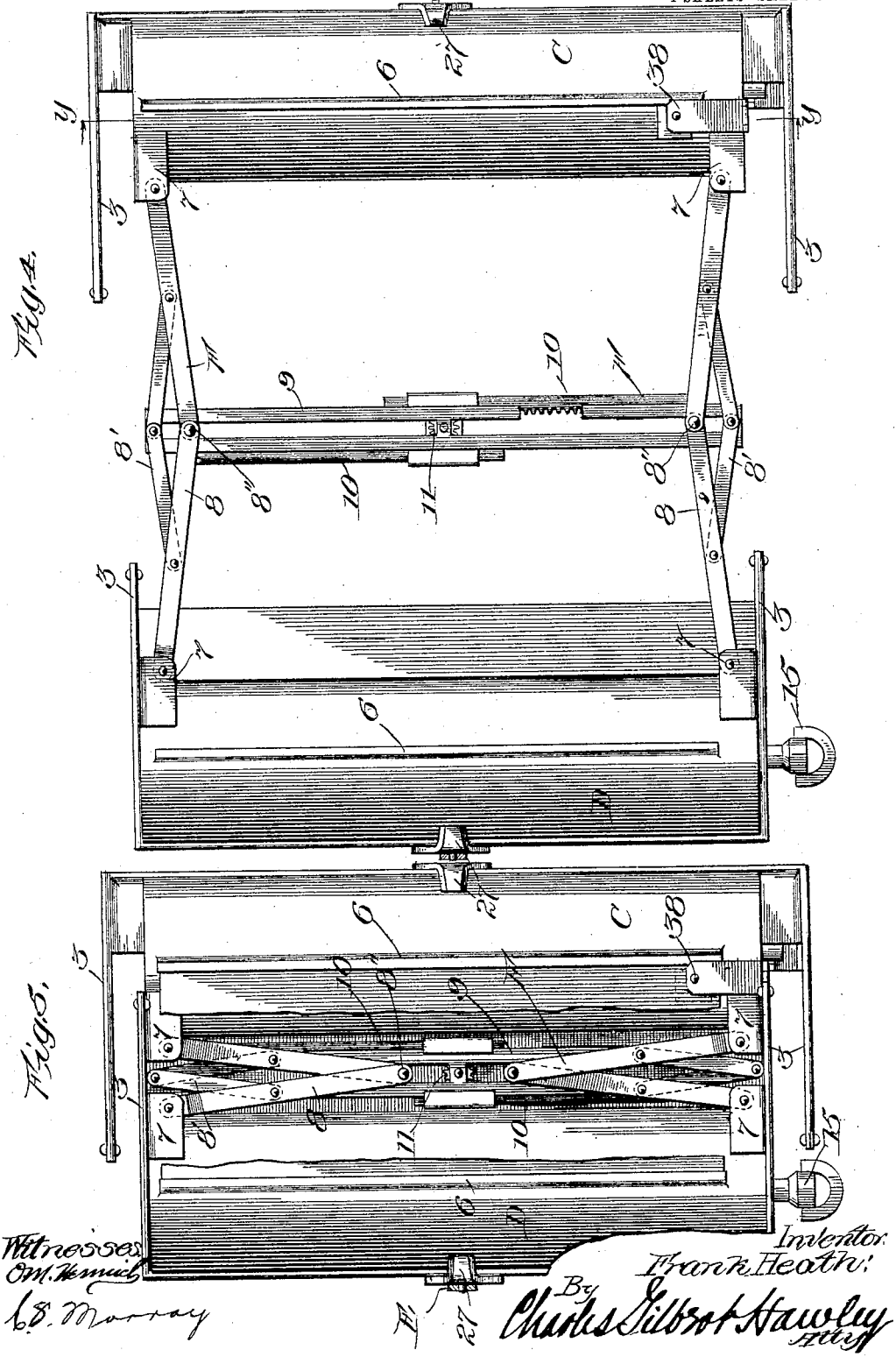

UNITED STATES PATENT OFFICE.

FRANK HEATH, OF NATIONAL CITY, CALIFORNIA.

POCKET-CAMERA.

No. 817,243.      Specification of Letters Patent.      Patented April 10, 1906.

Application filed November 7, 1904. Renewed October 4, 1905. Serial No. 281,246.

*To all whom it may concern:*

Be it known that I, FRANK HEATH, a citizen of the United States, residing at National City, San Diego county, California, have invented a certain new, useful, and Improved Pocket-Camera, of which the following is a specification.

My invention relates to photographic cameras, and has special reference to that class of cameras known in the trade as "pocket-cameras." Such cameras are limited to sizes which can be conveniently carried in the pocket, and thus limited are confined to cameras having capacity for only the narrower sizes of photographic films, the width of the photographic camera being determined by the length of its film-rolls, which must be considerably less than the width of an ordinary coat-pocket. A pocket-camera is usually of greater length than width, the excess being necessary for the accommodation of the film-rolls.

My invention is founded upon the conception that it is possible to make a pocket-camera which shall be capable of holding a much wider film and yet when folded be of no greater external dimensions than the ordinary camera, provided the construction thereof is such that the film-rolls shall occupy vertical instead of horizontal positions when the camera is carried, as in a coat-pocket, and provided, further, that means are devised which shall permit the film-rolls to move together or collapse when the camera is folded. With this conception, original I believe with me, in view the object of this invention is to provide a relatively large camera which may be folded or collapsed into a relatively small space.

Another object of the invention which, as will appear hereinafter as incidental to the collapsibility of my camera, is to adapt the camera for taking pictures of different lengths upon the same film or sensitized strip. The longitudinal dimension of the film is spoken of as the length thereof and of its parts. I am informed that this has never before been accomplished with a film-camera and in the case of plate-cameras has only been attained through the employment of plate-covering devices commonly called "kits," the use and operation of which is conceded to be unsatisfactory.

Another and particular object of the invention is to improve the construction of the film-cameras by providing means for measuring and marking the exposed portions of the film in such manner that they may be readily detected by the sense of touch or sight, to the end that after several portions of the film have been exposed they may be severed therefrom and from one another and developed separately according to the best obtaining practice, as with dry-plates.

A further object of the invention is to provide a camera wherein a fresh portion of the film may be drawn forward to be exposed and thereafter, if the exposure is not required, rewound upon a supply-roll and not wasted.

A camera designed to fulfil the objects of this invention as thus far recited requires a finder which shall automatically indicate the extent or length of the film that is exposed between the relatively movable film-rolls of the camera, and a special object of my invention is to provide a finder of this kind.

Other objects of my invention will appear hereinafter.

My invention, generally characterized as above, may be specifically defined as a photographic camera comprising a suitable lens-plate and bellows or equivalent in combination with collapsibly-joined film-cases, which with suitable flexible parts constitute the back or rear end of the camera.

Further, my invention consists in various details of construction and in combinations of parts, all as hereinafter described, and particularly pointed out in the claims.

My invention will be more readily understood by reference to the accompanying drawings, forming a part of this specification, and in which—

Figure 1 is a plan view from beneath of a camera embodying my invention, showing the adjustable parts fully extended, as when a large picture is to be taken. Fig. 2 is a similar view showing the camera partially closed and in position for taking a small picture. Fig. 3 is a side elevation of my invention, showing the side frame or support, also showing in dotted lines the position of the front portion or lens-plate of the camera when folded. Fig. 4 is a front elevation of the camera fully extended on the line $z\ z$ of Fig. 1 viewed in the direction of the arrows. Fig. 5 is a similar view showing the camera folded. Fig. 6 is a sectional view of one of the roll-casings or barrels of the camera on the line $y\ y$ of Fig. 4. Fig. 7 is a detail view of the opposite barrel of the camera with a portion of the inclosing portion broken away to show the internal parts. Fig. 8 is an end view of one of the barrels of the camera, showing the method of construction whereby when the same are closed, all light is excluded from the interior of the said barrels. Fig. 9 is a view of a device on barrel A, by means of which a hole is made in the edge of the photographic film, as hereinafter described. Fig. 10 is a rear elevation of the means used for attaching the side braces or supports to the lens-plate of the camera, being on the line $x\ x$ of Fig. 1 viewed in the direction of the arrows. Fig. 11 is an enlarged detail of a novel view-finder whereby that portion of the object to be photographed is reflected in the finder in exact proportion to the distance which separates the barrels A and B of the camera.

As shown in the drawings, my camera comprises in its preferred form a lens A, a lens-plate B, the film-roll casings or barrels C and D, and the folding lazy-tongs-like extensible frame E, connecting the barrels with the lens-plate. The two barrels are connected by a lazy-tongs mechanism F, which holds the barrels parallel in all positions. The bellows or closure of the camera G extends from the lens-plate to the roll-casings and is completed by a bellows-back section 8, extending between said casing.

Attention is directed to the novel construction of the bellows. Inasmuch as the front portion of the camera is not collapsed horizontally, but instead is swung from a horizontal position to a vertical position, the lens-plate taking a position of rest upon the top of the barrels C D, ordinary camera-bellows cannot be employed. In place thereof I make the bellows of a plurality of straight flat pieces of leather. Thus the sides, top, and bottom of the bellows comprise flat pieces having suitable shapes and preferably strengthened by inelastic tapes to prevent the stretching thereof. The back of the bellows is also a flat piece. The top, bottom, and back sections of the bellows are joined at the middle and by means of the extended hinge portions upon the barrels. These hinge portions are arranged in different planes, so that they may collapse together, and when the two barrels are collapsed or moved together the top, bottom, and back sections of the bellows make single folds, respectively, as indicated by the middle fold-lines of Figs. 1 and 2. The forward end of the bellows is attached to the lens-plate, and I prefer that it shall take the irregular form shown, the sides being angular and attached to the side bars adjacent to the hinges 36, a construction which operates at all times to distend the front end of the camera-bellows.

The lens A is of the usual "universal" type and is attached to the plate B in any desired manner. The plate B carries the finder I and the shutter mechanism J, both of which will be described in detail hereinafter. These parts constitute the front end of the camera. The rear end of the camera comprises the roll-casings C and D, the bellows-section H, connecting them, and the lazy-tongs or parallel-motion mechanism F. The casings or barrels C and D are substantially identical. A cross-sectional view thereof is shown in Fig. 8. Each cylindrical barrel is split or divided into two parts, having hinge parts 2 and 3 pivoted at distant points for a purpose hereinafter mentioned. The parts of each barrel are provided with flanges and grooves 4 and 5, which relation is preserved in the parts 2 and 3, so that the barrel members close together after the manner of a jackknife. As all metallic parts are covered with leather or like material, the joints between the members will be light-tight when same are closed. It should be observed that the edges of the bellows-sections are attached to the hinge members 2 and 3. The inner member of each roll-casing is provided with a film-slot 6. Each said inner section is provided with lugs 7 7, to which the lazy-tongs levers 8 8 of the mechanism F are attached. The short members 8' of the lazy-tongs levers are pivotally attached to the ends of the rack-casing 9, while the middle joints 8'' of the longer members are attached to the racks 10 and 10', respectively. These racks slide in the pieces 9 and are connected by a pinion 11, held in said casing. The movement of either lazy-tongs lever operates to correspondingly move the other through the medium of the racks and of the pinion. Thus the barrels are at all times kept parallel.

The roll-casing D contains a take-up roll or shaft 12, held in bearings 12' 12' and at one end provided with a ratchet-wheel 13, normally engaged by a detent 14. 15 is a winding-knob connected to the shaft 12 by a spring-clutch 16. (See Fig. 7.) The shaft 12 may be turned in only one direction and is non-automatic. The corresponding roll-casing C contains a supply-roll 17 of such construction and arrangement that the film being drawn from the roll places under tension a spring that is adapted to rewind the film, if need be. Means are provided for freeing the film from the tension of the spring when it has been definitely decided to remove the film from the supply-roll. Referring to Fig. 6, it will be seen that the roll 17 contains a rod 18, attached thereto at one end. On the rod is a spring 19, having one end attached to the rod and roll. At the opposite end is a spur-wheel 20, journaled on the rod 19 and whereto the free end of the spring 18 is attached. A detent 21 in the roll-casing normally prevents the rotation of the wheel 20. Therefore when the roll 17 is turned the spring 19 will be placed under tension.

22 is a bevel-edged disk slidable on the end of the rod or shaft 18 and held against rotation thereon by a cross-pin 23.

24 is a spring acting against the disk 22.

25 is a pin on disk 22 to enter between teeth of the wheel 20.

26 is an operating-lever intended to be actuated by the finger to force the disk 22 inward. When this is done, the disk strikes the lug 21' on detent 21 and releases same from wheel 20. At a moment either preceding or following this action the pin 25 engages the wheel 20. If such engagement precedes the release of detent 21, the unwinding of the spring will be prevented, while if it follows such disengagement the spring will be permitted to partly unwind.

Both of the rolls may be removed when the rear sides of the casing are swung open. It should be observed that when said rear sides are open large spaces will be left between the parts of the casings, through which access may be had to the interior of the bellows as required for threading in a fresh film. It is for the purpose of providing these openings or spaces that I employ the hinge extensions 2 and 3.

The outer side of each roll-casing has a lug or boss 27 for pivotal attachment to the supports for the lens-plate. These supports are the lazy-tongs-like structure before referred to and each side thereof comprises four parts 28, 29, 30, and 31. The end pivots 32 and 33 upon the casings and the plate B, respectively, are arranged at right angles. The pivots 34 and 36 are parallel with the pivots 33, and an intermediate pivot 35 is parallel with the pivot 32. The parts 29 and 30 are limited by a lug 29 on the former, and the pivot at this point permits the side or supporting bar to be folded, as shown in dotted lines in Fig. 3, whereby the lens-plate may be swung above or opposite the end of the roll-casing. This illustrates the folded condition of the camera, at which time it should be noted the roll-casings are collapsed, as shown in Figs. 2 and 5. The inner ends of the lever parts 31 are bifurcated to separate or divide the pivots 33 and form a stable connection with the lens-plate B. To prevent the idle swinging of the lens-plate, I connect opposed sections 30 and 31 by cross-bars 37, which to remove them from contact with the bellows G are pivotally attached to depending lugs 30' and 31' on said parts. (See Figs. 2 and 10.) To permit the necessary sliding movement between the cross-bars, same are provided with flats 37' and pins or lugs 37''. An essential and novel characteristic of this construction is that the members of the lens-plate-supporting mechanism automatically compensate for any decrease in focal distance that would be occasioned by the spreading apart of the roll-casings if said casings and plate were connected by simple links.

The means employed maintain the correct focal distance.

The understanding of the remaining portions of my invention will be facilitated by the description of the operation of the assembled parts thus far described. Save for the absence of the bellows, the left-hand portion of Fig. 3 together with the dotted lines correctly represent the folded or collapsed condition of the camera. When it is desired to take a picture, the lens is thrown out to the position shown by full lines in Figs. 2 and 3. If a picture of short length or altitude is desired, the rolls remain as in Fig. 2, and only a small portion of the film is exposed between the inner sides of the roll-casings. If a larger picture is desired, the roll-casings are separated to any distance within the maximum spread of the camera, the lens being meantime kept at the proper distance from the film by the action of the lazy-tongs-like support or frame. As the take-up roll 12 cannot turn backward, it is obvious that the spreading of the casings will cause the supply-roll to unwind and increase the film area exposed within the camera. When the rolls have been separated a sufficient distance, the lever 26 is depressed, thereby through the action of disk 22 and detent 21 causing the spring to become an idle part of the supply-roll and relieving the operator from the necessity of holding the roll-casings against the tension of said spring. The cap or shutter of the lens may then be operated to take the picture. There now follows an interesting operation peculiar to my invention. Within the bellows and hinged upon the casing C is a spring-punch 38, which being pressed upon through the bellows will punch a hole in the film adjacent to the slot in casing C. When this has been done, the casings are collapsed, and the slack in the film is taken up by turning the knob 15. I usually employ a small ruby glass or like non-actinic plate in the bellows adjacent to the slot in casing D, and the film is wound upon the take-up roll until the punch-hole appears opposite said slot. If desired, the ruby glass may be dispensed with and a mechanical "feeler" substituted. The punch-holes serve to correctly divide the several pictures or exposures upon the film, and therefore facilitate the development of all or the several parts of the film according to the best practice of the art.

It is obvious that my invention is not confined to any particular manner of operating the winding-rolls and the parts associated therewith, different users having different methods in that regard.

From the foregoing it will be obvious that the length of successive pictures taken upon the film will vary according to the will of the user. In this connection and in order that the user may know the exact extent of the image that will be received upon the variable film area I employ a finder which automatically indicates the extent of that area. This finder is illustrated in several figures of the drawings, more particularly Fig. 11. The finder-box contains the usual ground-glass plates and mirrors and in addition thereto a mechanism disposed in one end of the box where it will not interfere with said parts and adapted to operate parallel indicators or fingers that are arranged, preferably, on the inner surfaces of the ground-glass plates. If desired, they may show upon the exterior thereof. The ground-glass plates are as usually arranged at right angles for use in the different positions of the camera, and the pairs of indicators or fingers 39 39 and 40 40 alluded to are correspondingly positioned. The arrangement is such that when the roll-casings are moved together the fingers of each pair are likewise caused to approach and restrict the area of the finder. The object to be taken must be imaged upon the ground glass between the fingers, else the image will not fall upon the exposed film within the camera. The indicators or fingers may be operated by any suitable mechanism connected to one of the supporting-sections 31. 41 represents this connection, and the finder-box contains a plurality of parallel-motion levers joined to the connection 41 through the medium of a swing-cross 42 and adapted to simultaneously operate both pairs of finder-fingers when the roll-casings are moved with relation to each other.

The lazy-tongs-like lens-supporting mechanism holds the lens at the proper distance from the film, but is preferably relieved from the duty of sustaining the weight of the lens. This weight is carried by the upper stretch of the bellows, this, if desired, being provided with an inelastic cord or jointed tie-bar.

It is obvious that numerous modifications of my invention will readily suggest themselves to one skilled in the art, and I therefore do not confine the invention to the specific constructions herein shown and described.

Having thus described my invention, I claim as new and desire to secure by Letters Patent—

1. In a pocket or folding camera, a lens-plate, in combination with independent film-roll cases and metallic means collapsibly connecting said cases and also connecting the cases to said plate, said means permitting said cases to be moved together or apart and also permitting said plate to be moved into the plane of said cases, and a flexible light-excluding closure, substantially as described.

2. In a folding or pocket camera a lens-plate and foldable members, extending rearwardly therefrom in combination with film-roll cases, each movable with relation to said plate, and connected with said members, parallel-motion means extending between said cases, suitable bellows and film-rolls arranged in said cases, substantially as described.

3. In a folding or pocket camera, a lens and bellows, in combination with film-roll cases, and associated parts, closing the large end of said bellows, said cases being equipped with film-holding parts and being collapsible, substantially as described.

4. In a folding or pocket camera, a lens plate or support, in combination with bellows extending rearwardly therefrom, relatively movable film-cases and a flexible part, closing the rear end of said bellows, and foldable bellows-distending members joining said support and cases, substantially as described.

5. In a folding or pocket camera, relatively movable film-cases, maintained in parallel relation and equipped with film-holding devices, in combination with a lens and collapsible lens-sustaining and light-excluding means, substantially as described.

6. In a folding or pocket camera, film-cases connected by parallel-motion means, in combination with film-rolls provided therein, said cases arranged to be opened for the removal and insertion of a film, the whole constituting the rear-end mechanism of the camera, substantially as described.

7. In a folding or pocket camera, independently-movable film-rolls, in combination with containing parts maintained parallel to each other, a lens, and a closure foldably connected with said parts, substantially as described.

8. In a folding or pocket camera, a lens-plate, in combination with collapsible, distensible film-holding means and focal-distance-maintaining means, joining the first-mentioned means and said plate, substantially as described.

9. In a folding or pocket camera, a lens-plate and film-holding means, including supply and take-up rolls, in combination with suitable flexible bellows and a manual film-punch adjacent to the supply-roll, normally out of engagement with the film and operable by pressure upon said bellows, substantially as described.

10. A folding camera-back, comprising parallel film-roll cases, in combination with a flexible closure attached thereto, parallel-motion means connecting said cases, a spring-resisted supply and retake roll arranged in one of said cases and a take-up roll arranged in the other case, substantially as described.

11. A folding camera-back, comprising metallic roll-cases composed of hinged parts, in combination with rolls in said cases and a parallel-motion mechanism joining said cases and adapted to be collapsed or extended laterally, substantially as described.

12. In a folding or pocket camera, parallel roll-cases adapted for relative lateral movement, in combination with a lens-plate, a lazy-tongs-like frame connecting said cases and plate and adapting said plate to be folded or collapsed to a position adjacent to the ends of said cases, substantially as described.

13. In a camera for taking pictures of different lengths, a laterally-distensible bellows, in combination with film and lens holding members in the ends of said bellows and parallel-motion mechanism joining said members, substantially as described.

14. In a folding or pocket camera, film-roll cases, parallel-motion mechanism joining the same for relative lateral movement, and suitable film-holding means, in combination with parts having distant hinges on said cases, said parts being joined by a flexible bellows portion, and when opened furnishing internal access spaces, substantially as described.

15. In a folding or pocket camera, the parallel laterally-separable film-roll cases, in combination with a lens-plate, a suitable bellows or closure and a finder, having parts movably indicating thereon the extent of the variable distance between said cases, substantially as described.

16. In a folding or pocket camera, the parallel laterally-separable film-roll cases and the mechanism joining the same, in combination with a lens-plate, focal-distance-maintaining mechanism joining said cases and plate, a finder and indicators upon said finder, actuated by said focal-distance-maintaining mechanism, substantially as described.

17. In a folding or pocket camera, the relatively separable film-roll cases and parallel-motion mechanism connecting said cases in combination with a film-punching device arranged on one of the said cases and movable therewith and film-supply and take-up means arranged in said cases, substantially as described.

18. In a folding camera of the kind described, a bellows, in combination with film-roll cases, partly framing the rear end of said bellows, each said casing comprising two parts having flanges and grooves to receive said flanges, substantially as and for the purpose specified.

19. An automatic film-tension-maintaining and retake-roll mechanism, comprising a suitable frame or casing, in combination with a roll containing a spring, a spur-wheel connected with said spring, a detent normally engaging said wheel, and a detent-disengaging disk movable longitudinally and having a pin or lug to engage said wheel, substantially as and for the purpose specified.

20. In a folding camera, the parallel film-roll cases, in combination with a rack-guide, racks therein, a pinion joining said racks and parallel-motion lazy-tongs levers connecting said cases and having their middle pivots connected respectively to said guide and racks, substantially as described.

21. In a folding camera, a lens-plate, in combination with oppositely-extending link members, 31, pivoted upon said lens-plate, side bars pivoted to said link members and extending rearwardly, distensible film-holding means at the rear ends of said side bars, diagonal members, 37, joining each side bar to the opposite link member, each said diagonal member being provided with a flat or cam surface and a pin or lug to engage the flat of the other diagonal member, whereby the effect of the lateral movement of the side bars upon the lens-plate is corrected and the focal distance between said lens-plate and the film-holding means is maintained, substantially as described.

22. In a folding camera, a lens-plate, in combination with link members, 31, pivoted thereon, side bars extending rearwardly from the said link members respectively, each said bar comprising pivotally-connected parts, film-holding means whereto the rear ends of said side bars are pivotally connected, whereby the lens-plate may be collapsed or folded to a position adjacent to the film-holding means, and suitable focal-distance-maintaining means, substantially as described.

23. In a folding or pocket camera, a lens-plate, in combination with side bars pivotally connected with said lens-plate, distensible film-holding means whereto said side bars are pivotally connected, said side bars comprising a plurality of pivotally-connected parts whereby said lens-plate may be collapsed or folded to a position adjacent to said film-holding means, substantially as described.

24. In a folding or pocket camera, a lens-plate, in combination with film-roll cases, each adapted to contain a film-roll, means joining said plate and cases, parallel-motion means connecting said film-roll cases, each of said film-roll cases having a hinged back, a flexible bellows portion joining the hinged backs of said cases and the bellows proper connecting said film-roll cases and said lens-plate, substantially as described.

25. In a camera, two film-holding cases comprising semicylindrical parts having distended hinge parts, and a flexible closure joining the outer portions of the two cases, substantially as described.

26. In a folding or pocket camera, the parallel, laterally-separable film-holding cases and the mechanism joining the same, in combination with a lens-plate, focal-distance-maintaining mechanism joining said cases and said plate and a suitable bellows or closure, substantially as described.

27. In a folding or pocket camera, parallel film-roll cases and parallel-motion mechanism connecting the same, in combination with a lens-plate, a flexible bellows or closure and means maintaining the focal distance between said plate and cases and permitting said lens-plate to be folded or collapsed to a position adjacent to said cases, substantially as described.

28. In a camera, a lens-plate, in combination with bellows attached to said plate, distensible film-holding means occupying and closing the rear end of said bellows, and means automatically varied in length by the movement of the film-holding means and adapted to maintain said means and said plate in parallel relation and fixed and maintaining the focal distance between the same, substantially as described.

29. In a camera, a lens-plate, in combination with a bellows attached thereto, film-holding means closing the rear end of said bellows and adapted to be collapsed and distended in a plane parallel with said lens-plate, and means operated by the movement of said film-holding means adapted to maintain the focal distance between the said means and said plate, substantially as described.

In testimony whereof I have hereunto set my hand, this 24th day of October, A. D. 1904, in the presence of two witnesses.

FRANK HEATH.

Witnesses:
F. H. SAMBORN,
W. S. HILL.